United States Patent [19]

Leonard

[11] Patent Number: 4,793,461

[45] Date of Patent: Dec. 27, 1988

[54] CONTAINER FEED APPARATUS

[75] Inventor: George E. Leonard, Bettendorf, Iowa

[73] Assignee: The Kartridg Pak Co., Davenport, Iowa

[21] Appl. No.: 19,220

[22] Filed: Feb. 26, 1987

[51] Int. Cl.$^4$ .............................................. B65G 43/00
[52] U.S. Cl. .................................... 198/341; 198/453; 198/463.4
[58] Field of Search ................. 198/453, 463.4, 341, 198/351

[56] References Cited

U.S. PATENT DOCUMENTS

| | | | |
|---|---|---|---|
| 3,148,759 | 9/1964 | Stanley et al. | 198/453 X |
| 3,592,319 | 7/1971 | Rousseau et al. | 198/634 |
| 3,774,747 | 11/1973 | Metchler | 198/453 |
| 4,134,486 | 1/1979 | Grone | 198/502.1 X |
| 4,157,206 | 6/1979 | Ikeda et al. | 198/341 X |

FOREIGN PATENT DOCUMENTS

2505333  8/1975  Fed. Rep. of Germany ...... 198/453

Primary Examiner—Robert J. Spar
Assistant Examiner—Jennifer L. Doyle
Attorney, Agent, or Firm—Lockwood, Alex, FitzGibbon & Cummings

[57] ABSTRACT

Apparatus for feeding cylindrical containers (cans) to a rotary filling machine having a turntable with a plurality of work stations (can stations) spaced around its border. Signal producing devices, such as cone-jet sensors, are provided to produce gate operating signals each time an inactive (malfunctioning) work station passes the signal producing device. The container feed apparatus includes a conveyor which receives containers into an elongated section wherein the containers form two parallel rows confined between parallel sides from which they pass into a funnel section wherein the containers form a single file and discharge sequentially to the infeed of a worm which delivers the containers sequentially to a transfer mechanism (star wheel) which transfers the containers to the work stations. A gate incorporated at the discharge end of the funnel section closes and opens to prevent containers from being fed to the inactive work station. The upper run of a conveyor belt supports and advances the containers through the container feed apparatus and preferably also removes the filled containers from the filling machine. When the gate is closed the containers in the elongated section between the parallel sides create a compresion spring-like force which is transmitted through the containers in the funnel section to the container at the gate. When the gate opens this force propels the lead container to the worm infeed thereby allowing the apparatus to operate at a faster speed than it otherwise would.

12 Claims, 4 Drawing Sheets

FIG_7

FIG_8

CONTAINER FEED APPARATUS

This invention relates generally to means and apparatus for feeding upright cylindrical containers at high speeds to work stations spaced around the border or periphery of the turntable of a rotary filling machine having filling heads associated with the work stations. More particularly, the invention relates to improvements in such container feeding apparatus which permit the filling machine to continue in operation at high speed with one or more of the filling heads inactive due to malfunctioning. Such improvements comprise signal producing means which responds to each time an inactive work station passes and cause the container feeding apparatus to hold back the container that would normally be fed to that work station.

Rotary filling machines are known and in commercial use, particularly in the aerosol packaging industry, which have up to twenty-four filling or charging heads which introduce product of propellent into containers which are conventionally metal cans. These rotary filling machines operate at relatively high speeds, particularly the ones that have a large number of heads such as 12–24 head machines. In addition to being known commercially, such rotary filling machines are described in various patents including, for example, Rousseau, U.S. Pat. No. 3,592,319 and Roberts, U.S. Pat. No. 3,857,424.

These rotary filling machines are relatively complex in their construction and operation and on occasion one or more of the filling stations or heads malfunctions. However, since these filling machines are normally integrated as part of a production or assembly line it is usually undesirable to shut down one of these machines for a period of time necessary to correct whatever has caused a head to malfunction. On the contrary, it is usually preferred to continue operating with a malfunctioning head until there is an opportunity (such as the end of a work shift) to service the machine and restore the malfunctioning head to normal operation.

These rotary filling machines usually include a turntable having work stations spaced around the border or periphery thereof with the filling heads in superposed relationship for introducing product or a propellent charge into a can supported at the work station. However, if a particular head is malfunctioning it is undesirable to deliver a container or can to that work station as would normally be done on each revolution of the turntable.

In order to deprive an inactive work station of receiving a can it is known to provide mechanism which operates automatically to hold back or stop the can that would ordinarily be fed and delivered to the inactive work station. One such mechanism is shown and described in the above-mentioned U.S. Pat. No. 3,592,319. That prior mechanism is essentially mechanical in nature and has proven quite satisfactory in operation at the lower filling speeds which were satisfactory and conventional at an earlier time. However, such mechanisms have not been satisfactory at high filling speeds (e.g. 600 cans per minute) currently encountered with machines having 12–24 heads.

The known rotary filling machines require conveyorized container feed systems to deliver containers at the desired speed(s) to a position adjacent the turntable from which the containers can be sequentially transferred onto the work stations spaced around the border or periphery of the turntable. So-called star wheels have been used to accomplish this container transfer operation. Worms or screws have in turn been used to sequentially feed or deliver the containers to the star wheels or other transfer mechanisms. Containers have been supplied to the infeed of the worms or screws by a conveyor mechanism of some type.

The present invention provides an improved conveyor mechanism for delivering containers sequentially to the infeed of the screw or worm and incorporate a gate mechanism for depriving the turntable of the container which would ordinarily be delivered to the malfunctioning or inactive station. Further, the present invention provides an improved signal creating mechanism which senses the inactivated work station on each revolution of the turntable and creates a signal which controls an improved gate operating mechanism which stops the lead container and then opens to allow it to be released and delivered to the infeed of the worm.

Heretofore, in known equipment, an appreciable time was required after the lead container had been halted or stopped on its way to the infeed of the worm in order for that lead container to be released and delivered to the infeed. This time requirement in turn dictated the speed at which the rotary turntable could operate when one of its work stations was shut down or inactivated due to a malfunctioning head. According to the present invention, so-called cone-jet sensors are used to sense each time an inactive work station on a rotary filling machine turntable passes by a given point and create signals which can be utilized to first close and then open the gate mechanism that prevents a can or container from being delivered to the inactive work station. The signals created by the cone-jet sensor are pneumatic in character and they activate fast acting valves which control double acting air cylinders which are operatively connected with the gate mechanism.

One particularly advantageous feature of the present invention is the incorporation in the container conveying and delivering mechanism of an elongated section wherein containers being conveyed on the upper run of a conveyor are confined between two parallel sides or rails so spaced that the containers arrange themselves in two parallel rows with the containers in each row slidably engaging the adjacent rail or side and also engaging the containers to the front and rear in the same row and one of the adjacent containers in the parallel row while being slightly spaced from the other adjacent container in the parallel row. It has been found that when the forward movement of containers so arranged is arrested while the conveyor upper run is still moving, a spring-like back pressure will build up in the elongated section which will be transmitted through a single file of containers in a funnel section to the lead container due to be discharged to the infeed of the worm. When the gate mechanism restraining the lead container opens under such conditions, the back pressure or force that has been built up serves to accelerate and propel the movement of the lead container to the infeed of the worm.

In view of the foregoing, it will be seen that an important object of the invention is the provision of improved means and mechanism for non-mechanically sensing a malfunctioning head and inactivated work station on each revolution of the turntable of a high speed rotary filling machine and creating thereby signals which will quickly close and open a gate mechanism so as to prevent a container from being fed to the inactivated work station, Another important object of the invention is the provision of improved conveyor means for delivering cylindrical containers to the infeed of a worm forming part of the feed mechanism for a rotary filling machine, such conveyor means comprising an elongated section with parallel sides along a conveyor which joins a combination funnel and gate section, the containers forming two rows in the elongated section and a single file in the funnel section, the parallel sides being so spaced that each contained in each row slidably engages the adjacent side, the containers immediately to the front and rear, and one of the two adjacent containers in the other row while being slightly spaced from the other adjacent containers, whereby the two rows move forward between the two parallel sides when unrestrained, and when restrained build up a forward pressure on the lead container in the funnel section.

Another important object of the invention is the provision in a container feed conveyor system to a rotary filling machine of a combination funnel/gate section which converts two rows of advancing containers into a single file with its gate mechanism being provided with pneumatically actuated toggle mechanisms responsive to pneumatic signals received from cone-jet sensors positioned to sense passage of a malfunctioning work station on the turntable of the rotary filling machine.

Still another important object of the invention is the provision in a conveyor system for delivering containers to the turntable of a rotary filling machine with each container being sequentially advanced by a worm to a location from which it is transferred to a work station on the turntable, of gate means operatively linked by signal creating means to the turntable and characterized by its ability to grip and stop without injury to a container which is next to be delivered to the infeed of the worm.

Certain other objects of the invention will be apparent to those skilled in the art from the following detailed description of a presently preferred embodiment taken in connection with the accompanying drawings wherein:

Figures 1, 2:
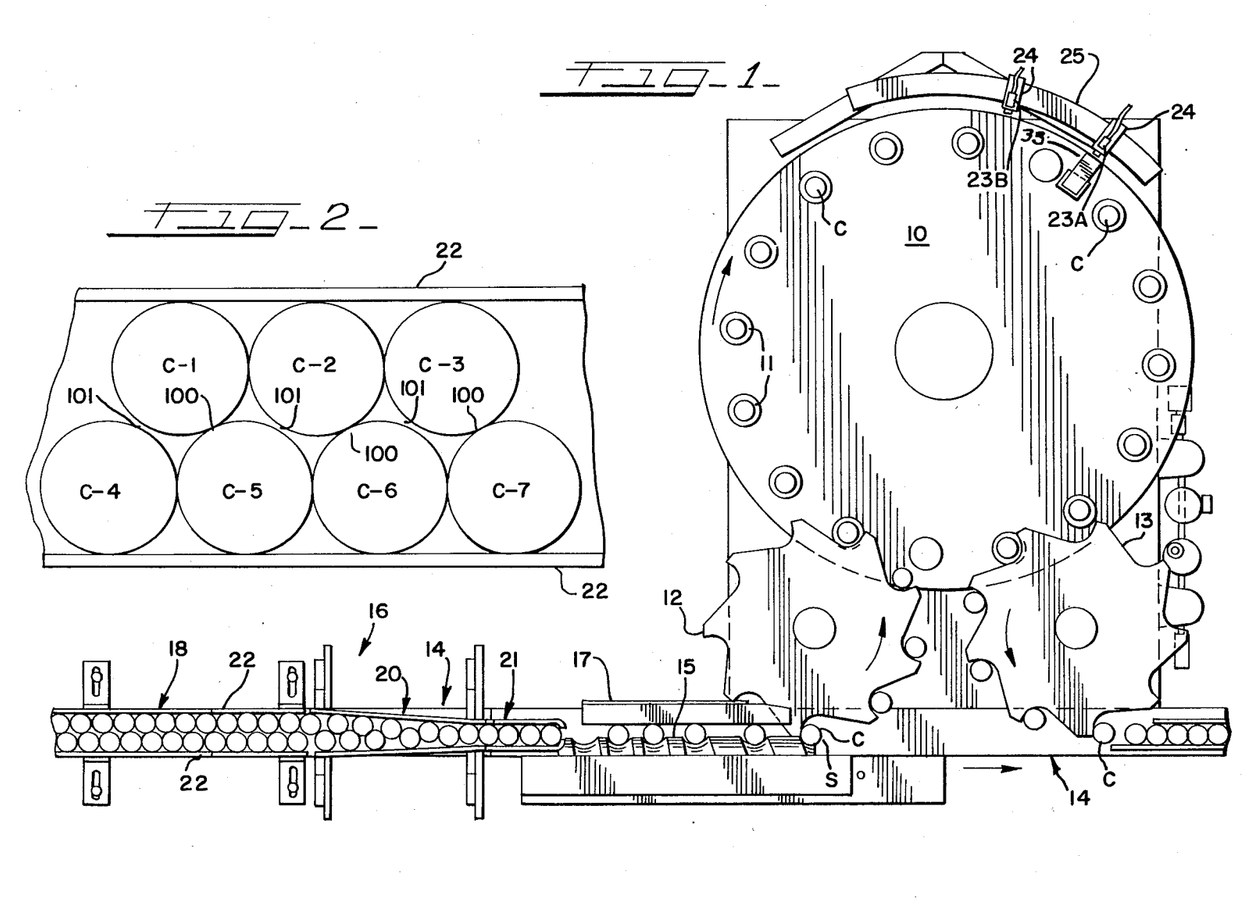
FIG. 1 is a plan view, with portions omitted, showing the turntable of a rotary filling machine in combination with a container conveyor feed system and in which important features of the present invention are incorporated.
FIG. 2 is a fragmentary plan view on enlarged scale of a portion of an elongated section of the container conveyor feed system shown in FIG. 1.

Referring to FIG. 1, a turntable is indicated generally at 10 which is representative of the rotating turntable or platform of a rotary product filler such as disclosed in U.S. Pat. Nos. 3,857,424 and 3,592,319. The platform 10 rotates in a clockwise direction as shown in FIG. 1 and, by way of example, is provided with sixteen equal spaced container locators 11—11 adjacent its border or periphery. The locators constitute so-called work stations or can stations. The rotary filler itself will have a corresponding number of so-called heads mounted directly above the locators 11 and will be operable in known manner to introduce a predetermined quantity of product into each of the containers C during the rotation of the turntable 10. The details of construction and operation of the heads do not form a part of the present invention.

The containers C are transferred sequentially from a container receiving station S (FIG. 1) by a star wheel 12 to the respective can locators or positioners 11 in known manner. The filled containers C are removed from the turntable 10 by a second star wheel 13 and deposited upon the container removal portion of a conveyor indicated generally at 14.

Each container C is delivered to the container receiving Station S by a worm 15 which is supported for rotation above the conveyor 14. Containers are sequentially released and delivered to the infeed of the worm 15 by a container feed conveyor mechanism indicated generally at 16. The containers C are retained in the spiral or helical groove in the worm 15 by a stationary rail 17.

Suitable driving means are operatively connected with the conveyor 14, worm 15, star wheel 12, and turntable 10 so that in normal operation containers are delivered by the mechanism 16 to the infeed of the worm 15 at the same rate that the containers are deposited at the receiving station S and removed therefrom by the star wheel 12 and transferred to the work stations 11 on the turntable 10. The synchronization of these parts and elements of the apparatus is conventional.

The container feed conveyor mechanism 16 has three sections in addition to the conveyor 14. One of these sections is an elongated dual row container conveying section indicated at generally 18 which discharges containers into a single file forming funnel section 20 which has a container gate mechanism 21 hinged to its narrow discharge end.

In normal operation containers C are delivered into the section 18 on the conveyor 14 at such a rate as to form and maintain two parallel rows of containers C in between the side plates 22—22 as shown in FIG. 2. In the funnel section 20, the containers C undergo a transition from a double row at the entry to a single file or single row at the narrow discharge end where the containers enter the gate section 21. In normal operation, the gate section 21 will be open and the containers will be delivered to the infeed of the worm 15 so that the worm 15 is filled to capacity with the containers C.

Figure 4:
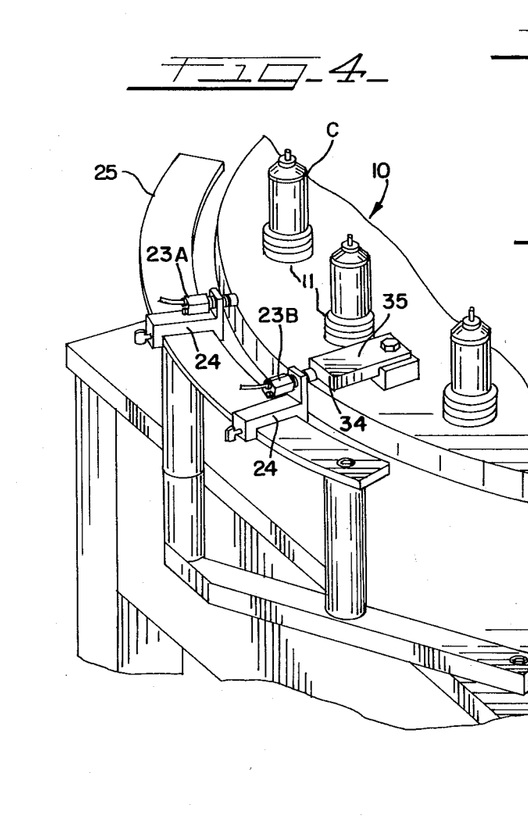
FIG. 4 is a fragmentary perspective view of the portion of the apparatus shown in FIG. 1 whereon signal creating sensors are mounted.
Figures 5, 6:
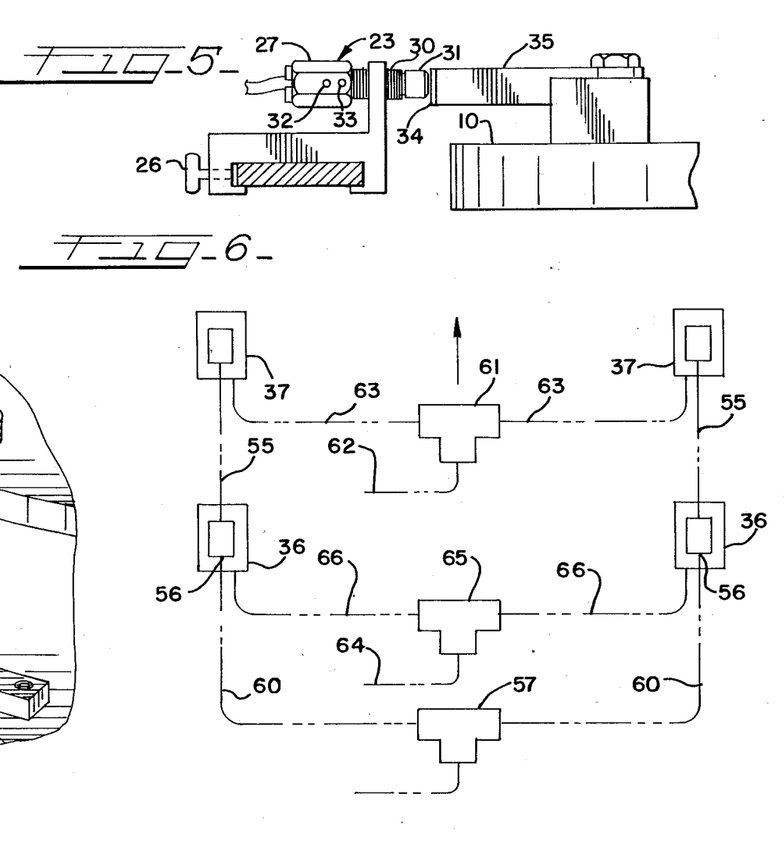
FIG. 5 is an elevational view on enlarged scale taken on line 5—5 of FIG. 4.
FIG. 6 is a diagrammatic view of the pneumatic system incorporated in the embodiment shown in FIGS. 1 and 3 wherein pneumatic signals created by the sensors are utilized to actuate and control the gate mechanism of the apparatus.

As previously mentioned, occasions arise when it becomes necessary to deactivate one of the work stations 11 on the turntable 10. Usually this situation arises when one of the product filler heads malfunctions for some reason. When such malfunctioning occurs, it will be undesirable if not prohibitive to deliver a container to the deactivated or malfunctioning work station since at the minimum it would be necessary for an operator to remove this particular container from the line of filled containers discharged from the turntable 10. Accordingly, a signal creating sensor mechanism is provided which will operate the gate mechanism 21 so as to grip and hold back the particular lead container that would ordinarily enter the infeed of worm 15 and be delivered to the inactivated or malfunctioning work station 11. A preferred signal creating sensor mechanism is shown in FIGS. 1, 4 and 5 and will now be described in connection therewith.

A pair of cone-jet sensors 23A and 23B are mounted on clamps 24—24 which in turn are mounted on a arcuate plate 25. Each of the clamps 24 is provided with a thumb screw 26 which allows it to be shifted to, and then retained in any desired position on the support rail 25. The arc of the curved support plate 25, the periphery of the turntable 10, and the circle in which the container locators or positioners 11 are arranged are all concentric.

The cone-jet sensors 23A and 23B are of known type such as Airmatic Beckett—Harcum Model No. 30-0490. Each of these sensors 23A and 23B is provided with a hex body section 27, a threaded section 30, and a nozzle 31. A pair of small air passageways (not shown) extend longitudinally through the body of each cone jet 23A and 23B with each of the passageways terminating at one end at the nozzle 31 with the other ends of the passageways communicating with transverse passageways 32 and 33 (FIG. 5) in the hex body section 27.

Normally, each air inlet passageway and port 33 is supplied with air typically at 2-3 pounds per square inch gauge pressure. This air flows through the passageway which communicates with the port 33 and discharges from the nozzle 31 freely except when the arcuate end 34 (FIGS. 4 and 5) of a so-called "flag" 35 in the form of a steel block passes by the end of the nozzle 31. The "flag" 35 or marker is temporarily mounted on the periphery of the turntable 10 when a positioner 11 is inactivated. The curved end surface 34 passes by the end of the nozzle 31 of each cone-jet sensor 23 on each revolution of the turntable 10. Since the surface 34 is spaced only a fraction of an inch (e.g. 3/32 inch) from the terminating end or face of each nozzle 31, when the air jet issuing from each nozzle 31 strikes the surface 34 it is reflected back through the adjoining longitudinal passageway resulting in a burst of pressure issuing from the port 32. Accordingly, each time the flag 35 passes through one revolution it will cause a pneumatic signal to be produced at each of the sensors 23A and 23B. These signals in the form of small surges of air pressure are utilized to operate pairs of three-way valves 36—36 (FIGS. 3 and 6) and 37—37 as will be described below.

The flag 35 will usually be set just after the work station 11 that is to be deprived of a can or container C. The exact placement of the flag 35 can be readily determined by operating the turntable 10 and associated can feeding components at slow speed and observing their operation. The gate closing sensor 23A should be set so as to close the gate 21 as soon as possible after the last can C has passed but without letting the gates touch the last can. The gate-opening sensor 23B should be set so that the next can is released from the gate so as to hit the infeed worm flight as soon as possible without getting nipped or dented by the infeed worm flight. When two or more adjacent heads are to be deprived of cans, two flags are used. The "stop" flag should be placed after the first or leading positioner 11 to be deprived of a can and the "start" flag should be placed after the last or trailing positioner to be deprived of a can.

The container restraining and releasing gate 21 comprises a pair of vertical plates 40—40 (FIGS. 3 and 7) which are hingedly mounted on vertical axes at their rear or proximal ends by hinges 41—41. At their front or distal ends the plates 40 are curved inwardly as indicated at 42—42. While the operating mechanism for both hinge plates 40 is the same, only one of the mechanisms is shown completely in FIG. 3. It comprises a double-acting cylinder 43 pivotally connected at its rear end by means of a block 44 (FIG. 7) and a pin 45 to the adjacent hinge post 48. The connecting rod 46 projecting from the forward end of the double-acting cylinder 43 extends into a guide block 47 which is rigidly mounted on the frame and has a machined guideway in which a slide 50 reciprocates. The outer end of the connecting rod 46 is pivotally secured to the slide 50 by a pin 51. A link 52 which is also pivotally attached at one end to the slide block 50 has its outer end pivotally connected by a pin 53 to a block 54 mounted on the side of the plate 40. With this arrangement, it will be seen that when the connecting rod 46 is retracted into the cylinder 43, each of the plates 40 o the gates is swung to its open position. Conversely, when the connecting rods 46 are extended the plates 40 are closed towards each other. This locking toggle arrangement produces a positive and fast opening and closing action which is important when the turntable 10 is part of a high speed rotary filling machine. The locking toggle allows the air to be exhausted from the double-acting air cylinder 43 while still positively holding back the can line. Since the cylinder 43 does not have to exhaust compressed air at the same time it is actuated, it moves very fast.

One source of air pressure regulated at 2 pounds per square inch, for example, is delivered to the cone-let sensors 23A and 23B and introduced through the ports 33. Another source of air pressure regulated, for example, at between 30-100 psig is provided to operate the double-acting cylinders 43. This additional source of air at higher pressure is delivered to the manifolds 55 (FIGS. 3 and 6) at their inlet ports 56.

A diagram of the air distribution system is shown in FIG. 6. In that diagram, a tee fitting is indicated at 57 the inlet connection of which is connected with a regulated source of air pressure between 30-100 psig. The dual outlet connections 60—60 from fitting 57 are connected to the inlet ports 56 of the manifolss 55 so as to maintain a constant operating pressure thereon. The signal produced by the cone-jet sensor 23A in the form of a burst of pressure is delivered to the inlet connection of a tee fitting through a line 62 which is connected with the outlet port 32 of sensor 23A. This signal pressure is in turn communicated from the outlet connections of tee 61 through lines 63—63 to the three-way control valves 37—37. In like manner, the air pressure signal from cone-jet sensor 23B is communicated from its port 32 through a line 64 to the inlet connection of a tee 65. The outlet ports of tee 65 are connected with the three-way valves 36 by lines 66—66.

In operation, when the flag 35 passes by cone-jet sensor 23B the resulting signal is communicated through line 64 to the tee 65 and in turn through lines 66 to the three-way valves 36. These valves are then actuated so as to connect the manifolds 55 to the connections 70 of the double-acting cylinders 43. When the pressure is thus admitted to these double-acting cylinders 43 through the connections 70 the connecting rods are extended thereby closing the gate members 40 on the lead container C and preventing it from reaching the infeed of worm 15. Conversely, when the flag 35 passes by cone-jet sensor 23A, the three-way valves 37 are actuated and operating air pressure from the manifolds 55 is introduced to the double-acting cylinders 43 through connections 71—71 causing the connecting rods 46 to retract. Upon retraction of the connecting rods 46 the toggle linkage produces fast opening or separation of the gate members 40 with release of the arrested lead container C.

Figure 3:
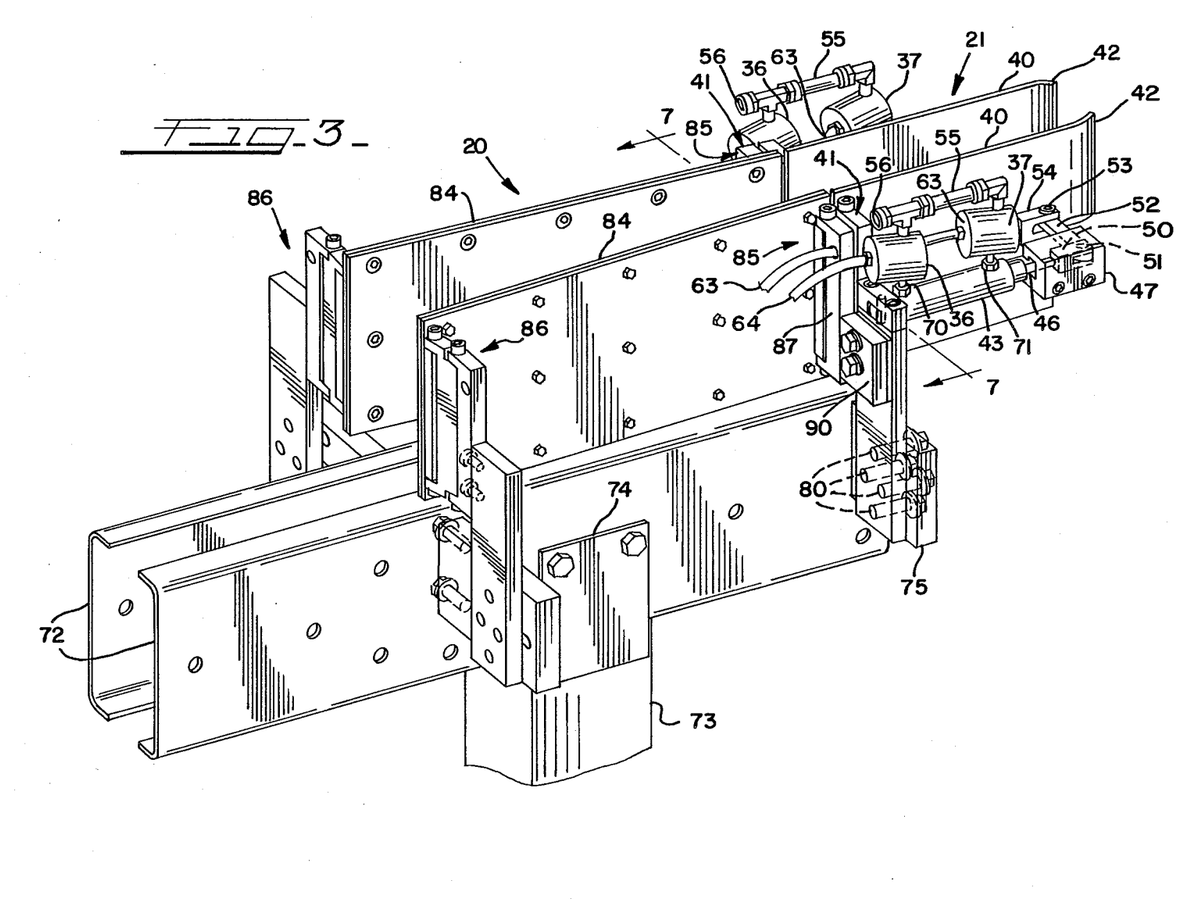
FIG. 3 is a perspective view showing the funnel and gate section of the container conveyor feed mechanism of FIG. 1.
Figure 7:
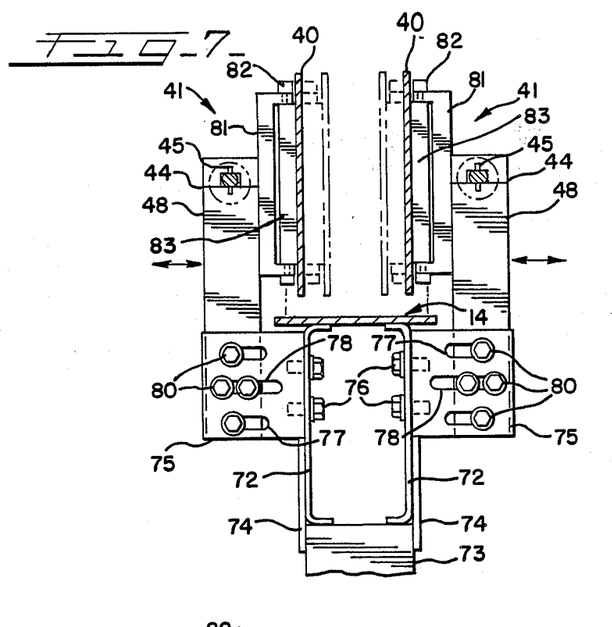
FIG. 7 is a sectional view taken on line 7—7 of FIG. 3.

Referring to FIGS. 3 and 7, the hinge structure 41—41 for supporting the gate members 40 are mounted on opposite sides of the main conveyor support beams 72—72 which in turn are supported on uprights or posts 73 on to the upper ends of which they are secured by plates 74. Support blocks 75 are secured by bolts 76—76 to opposite sides of the beams 72. Each of the blocks 75 is provided with a pair of upper and lower horizontal slots 77—77 and a longer intermediate slot 78.

The blocks 75 serve to support the hinge posts 48—48. The posts 48 are laterally adjustable toward and away from each other with the adjustment movement being permitted by a plurality of bolts 80—80 fitting in the slots 77 and 78 and extending into tapped holes in the lower ends of the posts 48.

A C-shaped hinge member 81 is mounted on the inside of each post 48 adjacent its upper end with the horizontal legs of each member 81 provided with registering holes for receiving the hinge pins 82—82. These pins 82 in turn extend into vertical holes provided therefore in blocks 83—83 rigidly attached to the outer sides of the gate members 40 adjacent their proximal ends.

The details of construction of the funnel section 20 of the container feed conveyor assembly 16 are shown in FIG. 3. This subassembly comprises a pair of plates 84—84 mounted above the conveyor 14 and the beams 72 by front hinge structures indicated generally at 85—85 and rear hinge structures indicated generally at 86—86. The rear hinge structures 86 correspond to the hinge structures 41—41. In the hinge structures 85 the C-shaped members 87—87 are carried on blocks 90 which are bolted to the hinge posts 48. It will be seen that by loosening the appropriate bolts in the hinge structures 41—41 and 86—86 the opposing ends of the plates 84 can be spaced apart the desired distances depending upon the diameters of the containers C.

Figure 8:
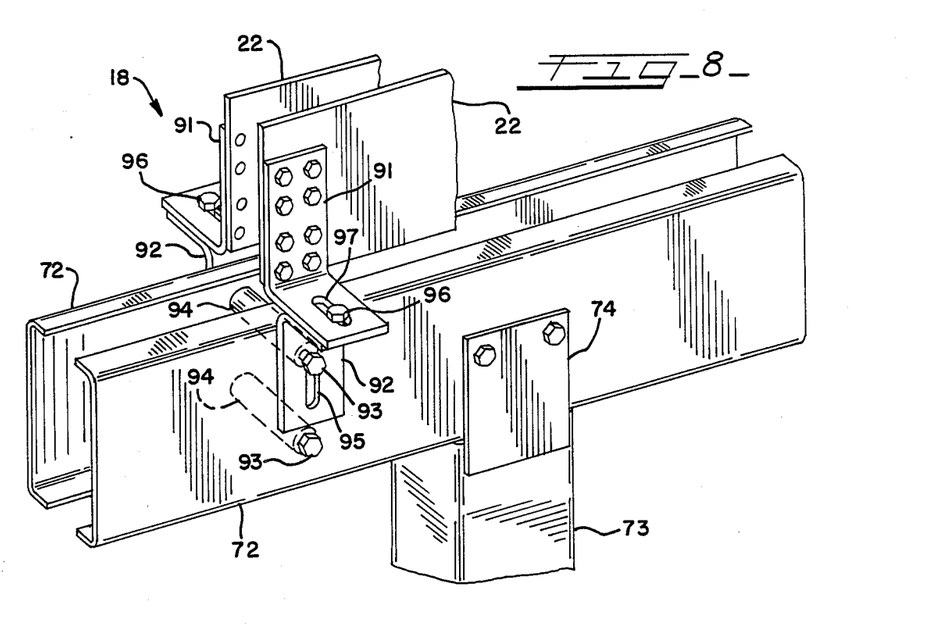
FIG. 8 is a fragmentary perspective view of a portion of the container conveyor feed system shown in FIG. 2.

The construction of section 18 of the container feed mechanism which has the two parallel sides or rails 22 between which parallel rows of the containers C flow is shown in FIG. 8. The can rails 22 are supported above the conveyor beams 72 and conveyor 14 by right angle brackets 91—91 having their vertical legs bolted to the outer sides of the rails or sides 22 and with their horizontal legs adjustably mounted on the horizontal legs of right angle brackets 92—92. The brackets 92 are in turn secured to the outer sides of the beams 72 by bolts 93—93 which extend into opposite ends of the upper of a pair of beam spacer sleeves 94—94. The lower spacer sleeve 94 is secured in place by additional bolts 93. The brackets 92 are adjustable by loosening the bolts 93 and raising or lowering the brackets 92 in the accommodating vertical slots 95. The brackets 91 are likewise adjustable in the horizontal direction by loosening the bolts 96—96 and thereby allowing the brackets 91 to be moved toward or away from each through the accommodation or adjustment permitted by the slots 97—97. The optimum adjustment or spacing of the guides or sides 22 will be explained in connection with the diagram contained in FIG. 2.

The can rail or sides 22 are adjusted so as to allow two lines of staggered cans C-1, C-2, C-3, C-4, C-5, C-6, C-7, etc. to form in the nestled configuration shown. It has been found that the section 18 should have a minimum length of six feet. The can nestle dimension for the conveyor rail adjustment of the sides 22 is derived from the following equation:

Can nestle dimension = can diameter × 1.866

The dimension required for feeding cans to the funnel section 20 in which they are accelerated is about 1/16 of an inch to ⅛ inch wider than the can nestle dimension. In this arrangement, it will be seen that all of the cans or containers abut the inner surfaces of the guide rails 22 and each container tangentially abuts or engages the containers to its front and rear. Thus, container C-2 engages containers C-1 and C-3. Further, each container tangentially engages one of the containers in the second or parallel row as indicated at 100—100 in FIG. 2 with little or no friction with guide rails 22. Thus, containers C-1, C-2, and C-3 engage containers C-5, C-6 and C-7, respectively. Importantly, each container is slightly spaced from the other adjacent container in the parallel row as indicated at 101—101. Thus, containers C-1, C-2 and C-3 are slightly spaced from containers C-4, C-5 and C-6, respectively. With the containers in the configuration or orientation shown in FIG. 2, the containers CC in each row now tangentially contact each other straight down the length the conveyor section 18 with little or no side loading and friction. Thus, the can line pressure will be proportional to the length of the cans backed up in the section 18. Thus high pushing force acts on the containers C in the funnel section 20 and in turn on the containers in single file in the gate 21. With this arrangement, the combined sections 18, 20 and 21 of the container feed mechanism 16 constitute an accelerator which positively advance each container to the infeed of worm 15. The resulting pushing force from the can line can causes the cans going through the gate 21 to travel twice as fast as the movement of the conveyor 14. This increased speed is what allows the cans to get into the infeed of the worm 15 fast and keep up with the worm feed when running at high speed. In addition, when it is necessary to put the gate 21 into operation by attaching a flag 35 to the turntable 10 as above described, the back pressure created in the section 18 and transmitted to the containers in the gate 21 acts to impart a propelling force on the lead container when the gates 40 are opened thereby quickly and positively positioning the lead container into the infeed of the worm 15.

What is claimed is:

1. In apparatus for feeding cylindrical containers having the same diameters to a plurality of work stations spaced around the border of a turntable, said apparatus having container transfer means operatively positioned to transfer said containers sequentially from a container-receiving location adjacent to said work stations, worm feed means having a container infeed receiving end and a container discharge end operatively positioned to feed said containers sequentially to said container receiving location, and conveyor means operatively positioned to deliver said containers one-at-a-time to said container receiving end, said conveyor means including a conveyor upper run operatively positioned to deliver upright cylindrical containers to said container receiving end, and container arranging and channeling means disposed above said upper run, said container arranging and channeling means having an elongated dual row container conveying section with fixed parallel sides communicating with a funneling section having a single file container discharge end juxtaposed to said container receiving end of said worm feed means, said parallel sides being spaced apart a predetermined distance in relation to the diameter of said cylindrical containers which distance is less than two container diameters and greater than one container diameter whereby in passing therethrough on said upper run said containers arrange themselves into two parallel rows confined between said parallel sides with the containers in each row abutting each other at the front and rear and with each container in each of said rows engaging one of the two adjacent containers in the other row and being slightly spaced from the other of said adjacent containers, and power means operatively connected in synchronized driving relationship with said turntable, said feed wheel and said worm feed means and operatively connected in driving relationship with said conveyor means whereby said containers tend to be delivered to said worm feed means at an appreciably faster rate than said worm feed means receives and delivers said containers to said worm feed means receives and delivers said containers to said feed wheel whereby the containers in said elongated container receiving section with parallel sides exert a forward feed pressure on each container reaching said discharge end of said funneling section.

2. In apparatus for feeding cylindrical containers having the same diameters to the circular turntable of a rotary filling machine having a plurality of work stations spaced around the turntable border, said apparatus having container transfer means operatively positioned to transfer said containers sequentially from a container-receiving location adjacent said turntable to said work stations, worm feed means having a container infeed receiving end and a container discharge end operatively positioned to feed said containers sequentially to said container receiving location, conveyor means operatively positioned to deliver said containers one-at-a-time to said container receiving end, and stationary signal producing means responsive to the passage thereby of a preselected one of said work stations, said conveyor means including a conveyor belt having an upper run operatively positioned to deliver upright cylindrical containers to said container receiving end of said worm feed means, and container arranging and single file forming and gate means disposed above said upper ru and comprising an elongated dual row container arranging and conveying section with fixed parallel sides communicating with a single file forming funneling section with gate means having a single file container discharge end juxtaposed to said container receiving end of said worm feed means, said parallel sides being spaced apart a predetermined distance in relation to the diameter of said cylindrical containers which distance is less than two container diameter and greater than one container diameter whereby in passing therethrough on said upper run said containers arrange themselves into two parallel rows confined between said parallel sides with the containers in each row abutting each other at the front and rear and with each container in each of said rows engaging one of the two adjacent containers in the other row and being slightly spaced from the other of aaid adjacent containers, said gate means being operatively combined with said container discharge end of said funneling section, power means operatively connected in synchronized driving relationship with said turntable, said container transfer means and said worm feed means, and operatively connected in driving relationship with said conveyor means whereby said containers tend to be delivered to said worm feed means at an appreciably faster rate than said worm feed means receives and delivers said containers to said feed wheel whereby the containers in said elongated container receiving section with parallel sides exert a forward propelling force on each container reaching said discharge end of said funneling section, and additional power means operatively connected with said gate means and said signal producing means to alternately close and open aaid gate means and prevent a container from being fed to said preselected one of said work stations.

3. In the apparatus called for in claim 2, a second container transfer means operatively positioned to sequentially receive filled containers from each of said workstations and transfer the filled containers to a filled container removal location, and container removal conveyor means operatively positioned to receive filled containers at said removal location.

4. In the apparatus called for in claim 3 said first-mentioned container transfer means and said second container transfer means being star wheels.

5. In apparatus for feeding cylindrical containers having the same diameters to the circular turntable of a rotary filling machine having a plurality of work stations spaced around the turntable border, said apparatus having container transfer means operatively positioned to transfer said containers sequentially from a container-receiving location adjacent said turntable to said work stations, worm feed means having a container infeed receiving end and a container discharge end operatively positioned to feed said containers sequentially to said container receiving location, conveyor means operatively positioned to deliver said containers one-at-a-time to said container receiving end, and stationary signal producing means responsive to the passage thereby of a preselected one of said work stations, said conveyor means including a conveyor belt having an upper run operatively positioned to deliver upright cylindrical containers to said container receiving end of said worm feed means, and container arranging and single file forming and gate means disposed above said upper run and comprising an elongated dual row container arranging and conveying section with fixed parallel sides communicating with a single file forming funneling section with gate means having a single file container discharge end juxtaposed to said container receiving end of said worm feed means, said parallel sides being spaced apart a predetermined distance in relation to the diameter of said cylindrical containers which distance is less than two container diameters and greater than one container diameter whereby in passing therethrough on said upper run said containers arrange themselves into two parallel rows confined between said parallel sides with the containers in each row abutting each other at the front and rear and with each container in each of said rows engaging one of the two adjacent containers in the other row and being slightly spaced from the other of said adjacent container, said gate means being operatively combined with said container discharge end of said funneling section, power means operatively connected in synchronized driving relationship with said turntable, said container transfer means and said worm feed means, and operatively connected in driving relationship with said conveyor means whereby said containers tend to be delivered to said worm feed means at an appreciably faster rate than said worm feed means receives and delivers said containers to said feed wheel whereby the containers in said elongated container receiving section with parallel sides exert a forward propelling force on each container reaching said discharge end of said funneling section, and additional power means operatively connected with said gate means and said signal producing means to alternately close and open said gate means and prevent a container from being fed to said preselected one of said work stations, said stationary signal producing means comprising a pair of angularly spaced devices each of which projects a jet of air against a surface of a flag mounted on the periphery of said turntable on each revolution of said turntable thereby producing a reflected surge of air pressure, and additional power means comprising, air cylinder means operatively connected with said gate means, air pressure actuated control valves operatively connected with said air cylinder means, and conduit means communicating said reflected surge of air pressure from each said devices that projects a jet of air to said control valves.

6. In the apparatus called for in claim 5, said single file form funneling section comprising a pair of converging side members which at their wide spaced ends join said parallel sides at the discharge end of said elongated dual row container arranging and conveying section, said gate means comprising a pair of vertical plates each of which is hinged at its rear end to one of the narrow spaced ends of said converging side members with each vertical plate having an in-turned container engaging distal end, said air cylinder means comprising two double-acting air cylinders, and locking toggle means operatively connecting each of said vertical plates with one of said double-acting air cylinders.

7. Container feed conveyor means for feeding upright cylindrical objects having the same diameters to a desired location comprising:
a conveyor upper run;
an elongated dual row container arranging and conveying section comprising fixed parallel side members extending above one portion of said upper run;
a single file forming funnel section comprising converging side members extending above a second portion of said upper run with said converging side members at their wider spaced ends juxtaposed to ends of said parallel side members;
and a container-stopping gate section attached to the narrower spaced ends of said converging members;

said parallel sides being spaced apart a predetermined distance in relation to the diameter of said cylindrical containers which distance is less than two container diameters and greater than one container diameter whereby in passing therethrough on said upper run said containers arrange themselves into two parallel rows confined between said parallel sides with the containers in each row abutting each other at the front and rear and with each container in each of said rows engaging one of the two adjacent containers in the other row and being slightly spaced from the other of said adjacent containers.

8. The container feed conveyor means of claim 7, wherein said gate means comprises a pair of plates extending above said upper run with one end of each plate hinged to the narrow spaced end of one of said converging side members.

9. The container feed conveyor means of claim 8, wherein said parallel side members are adjustably spaced apart, said converging side members are adjustably spaced apart, and said juxtaposed ends are hinged together.

10. The container feed conveyor means of claim 8 further comprising gate operating means comprising, a double-acting air cylinder for each of said plates, and a locking toggle linkage interconnecting the piston rod of each said air cylinder with its associated plate.

11. The method of feeding upright cylindrical containers having the same diameters to a desired location which comprises,
arranging the containers in two elongated parallel rows on a travelling conveyor between two parallel guide rails with each container tangentially engaging the adjacent guide rail, the fore and aft containers, and one of the two adjacent containers in the adjacent parallel row without engaging the remaining of said two adjacent containers;
converting said two elongated parallel rows of containers into a single file between converging guide rails on opposite sides of said travelling conveyor;
sequentially discharging said containers into gate means; and
periodically actuating said gate means to restrain preselected containers.

12. In the method of feeding cylindrical containers to a rotary operating machine having a turntable on which containers are delivered to predetermined positions on the border of the turntable and wherein the containers are sequentially delivered to the infeed of a container feed screw, delivered by said screw to a position adjacent said turntable for transfer thereto, and transferred from said transfer position to one of said predetermined positions on said turntable, the improvement which comprises:
arranging the containers in two elongated parallel rows on a travelling conveyor between two parallel guide rails with each container tangentially engaging the adjacent guide rail, the fore and aft container, and one of the two adjacent containers in the adjacent parallel row without engaging the remaining of said two adjacent containers;
converting said two elongated parallel rows of containers into a single file between converging guide rails on opposite sides of said travelling conveyor;
sequentially delivering each leading container from said single file to said infeed of said container feed screw, creating a first pneumatic signal on each revolution of said turntable when a marker mounted thereon and associated with one of said predetermined border positions passes a first sensor, subsequentially creating a second pneumatic signal on each revolution of said turntable when said marker passes a second sensor, utilizing said first pneumatic signal to close gate means and thereby temporarily restain and prevent delivery of the leading container from said single file; and utilizing said second pneumatic signal to open said gate means and thereby release said temporarily restrained container.

* * * * *